(No Model.)
A. DEISHER.
PROCESS OF PRESERVING EGGS.
No. 445,164. Patented Jan. 27, 1891.
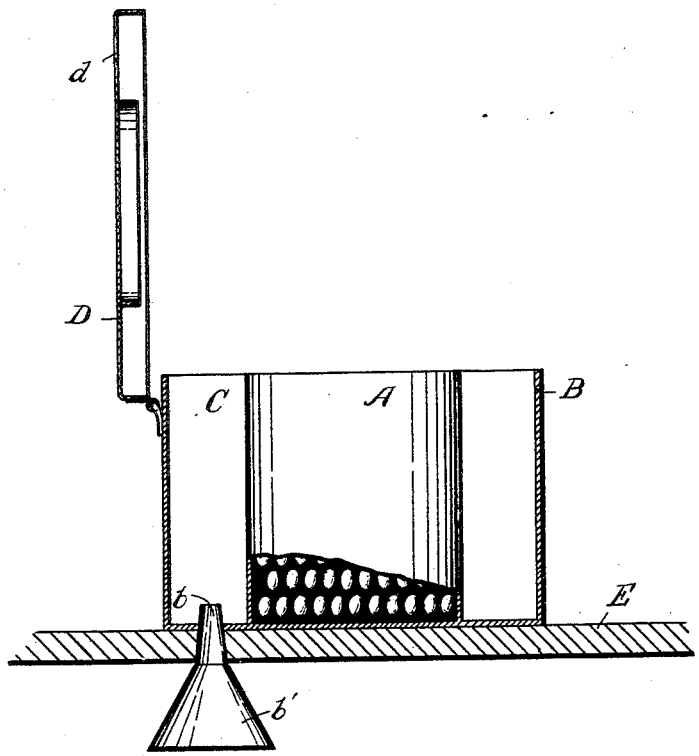
Witnesses
E. A. Kelly
David Levan
Alfred Deisher
Inventor
By his Attorney

UNITED STATES PATENT OFFICE.

ALFRED DEISHER, OF FLEETWOOD, PENNSYLVANIA.

PROCESS OF PRESERVING EGGS.

SPECIFICATION forming part of Letters Patent No. 445,164, dated January 27, 1891.

Application filed October 2, 1890. Serial No. 366,816. (No model.)

*To all whom it may concern:*

Be it known that I, ALFRED DEISHER, a citizen of the United States, residing at Fleetwood, in the county of Berks, State of Pennsylvania, have invented certain Improvements in the Process of Preserving Eggs, of which the following is a specification.

The main object of this invention is to provide an improved method and means of preserving eggs.

In order to effectually close the pores of the egg-shells and provide an impervious coating thereon I proceed as follows: First the surface of the shell is treated with an application of vinegar or other acid liquid for the purpose of effectually removing or neutralizing any foreign matter thereon and preparing the shell to receive the composition hereinafter described, the perfect adherence of which is essential to the preservation of the egg. This composition consists of pulverized plaster-of-paris and rye-flour, two parts of the former being thoroughly mixed with one of the latter in the form of a fine powder. After having treated the shells of the eggs as already described, and before they are dry, this composition is applied with the dry hands or in any other suitable manner, so as to form a very thin coat, which perfectly fills the pores and forms an impervious covering, which cannot be removed by any amount of ordinary handling, and which at the same time does not change the natural appearance of the egg or in any way interfere with its subsequent use. Having thus coated and protected each individual egg I prefer to store them, as illustrated in the drawing, which shows a sectional elevation of the apparatus I employ. They are packed in any suitable manner in the inner receptacle or box A, which may be of any desired material. Surrounding this box is an inclosure B, at some distance therefrom, so as to form an air-chamber C around the box A. The height of the latter is the same as that of the inclosure B, and a lid D is arranged to form a cover for both the box A and the chamber C. The latter is provided with a cold-air inlet $b$, with which is connected a funnel-shaped mouth-piece $b'$. This funnel is represented as passing through the floor E, upon which the apparatus is supported, and opens into a cellar or other cool compartment. In the lid or cover D is an outlet-opening $d$. By this means a current of cool air is kept continually passing around the box A, which is thus maintained at a moderately low temperature.

It is not at all necessary that the box should be kept hermetically sealed. Access may be had thereto at any time without danger of injuring the eggs, which are separately protected and preserved by the coating already described, the main function of the storage being merely to insure their being kept in a moderately cool temperature.

It is evident that other than rye-flour may be used, though I prefer this on account of its greater adhesive qualities.

What I claim is—

1. The process of preserving eggs, which consists in first applying an acid, as vinegar, to the shell, and thereafter coating the same with a composition of rye-flour and plaster-of-paris, substantially in the manner and for the purpose set forth.

2. The process of preserving eggs, which consists in first applying an acid, as vinegar, to the shell, then coating the same with a composition of rye-flour and plaster-of-paris, and finally in maintaining a low surrounding temperature after packing, substantially as set forth.

In testimony whereof I affix my signature in presence of two witnesses.

ALFRED DEISHER.

Witnesses:
  W. G. STEWART,
  ED. A. KELLY.